United States Patent [19]

Lewis et al.

[11] 4,384,291

[45] May 17, 1983

[54] EFFICIENT LOW-SIDELOBE PULSE COMPRESSION

[75] Inventors: Bernard L. Lewis, Oxon Hill; Frank F. Kretschmer, Jr., Laurel, both of Md.

[73] Assignee: The United States of America as represented by the Secretary of the Navy, Washington, D.C.

[21] Appl. No.: 254,311

[22] Filed: Apr. 15, 1981

[51] Int. Cl.³ .............................................. G01S 13/28
[52] U.S. Cl. ........................ 343/17.2 PC; 343/5 FT; 343/5 NQ
[58] Field of Search .......... 343/5 FT, 5 NQ, 17.2 PC

[56] References Cited

U.S. PATENT DOCUMENTS 3,680,105  7/1972  Goldstone ................. 343/17.2 PC
4,028,700  6/1977  Carey et al. ............... 343/17.2 PC
4,237,461  12/1980  Cantrell et al. ......... 343/17.2 PC X Primary Examiner—T. H. Tubbesing Attorney, Agent, or Firm—Robert F. Beers; William T. Ellis

[57] ABSTRACT

A pulse compression system for use with step approximation to linear FM and Frank coded signals to eliminate sampling errors and range time grating lobes while providing large pulse compression ratios comprising: a receiving circuit for receiving echo signals, a converting circuit for converting echo signals from the receiver to I and Q baseband signals without clock sampling, a sliding window discrete Fourier Transform or fast Fourier Transform (FFT) circuit including a taped delay line and a plurality of resistor-type phase weighting networks and adders for generating a plurality of output signals representing the different frequency steps in the signals, a delay circuit for differentially delaying the output frequency steps from the sliding window DFT circuit so the the output steps occur simultaneously, and a summer for adding the differentially delayed outputs to yield a short pulse with a peak amplitude when a coded echo pulse is correctly indexed within the delay line of the DFT circuit.

7 Claims, 5 Drawing Figures

EFFICIENT LOW-SIDELOBE PULSE COMPRESSION

BACKGROUND OF THE INVENTION

This invention relates generally to radar processing systems, and more particularly to pulse compression systems yielding low range-time sidelobes.

It is well known in the art of pulse radar systems that in order to obtain a good detection capability against a background of the noise, a pulse with a large energy content must be transmitted. This large energy content may be obtained by either transmitting a pulse with a large peak power and/or with a long pulse duration. If the pulse width is limited to small values because of the desire to obtain good range accuracy or resolution, the required energy pulse must be obtained with a large peak power. However, in many applications it is not possible to obtain a peak power as large as one might desire because of voltage-peak limitations somewhere in the system. In such peak-power-limited radar systems, the required energy can be obtained only by transmitting a longer pulse.

It is now recognized that the range resolution is not governed by the pulse length but by the overall transmitted bandwidth. Thus, by modulating the carrier within the transmitted pulse length and thereby increasing the bandwidth, the range resolution may be improved with no reduction in mean transmitted power.

Radars using such modulated carrier pulses to increase the bandwidth of the signal are referred to as pulse compression systems. The use of such pulse compression techniques permit the transmitted pulse to be made as long as desired while retaining an optimum range resolution.

The modulation or coding utilized to increase the bandwidth of the transmitted pulse may be either phase or frequency coding. In the compression process, a long coded pulse with an increased bandwidth B much greater than the reciprocal of the pulse length due to the frequency or phase coding is transmitted and echo returns therefrom are decoded to form short pulses with a duration equal to 1/B.

It has been found that the use of the Frank phase code (R. L. Frank, "Polyphase Codes With Good Non-Periodic Correlation Properties", I.E.E.E. Transactions IT-9, 43-35, January 1963) is especially advantageous because it has excellent doppler tolerance and very low range-time sidelobes (the highest sidelobe is approximately $p\pi^2$ down from the mainlobe, where p is the pulse compression ratio). Such phase codes are generated by transmitting a phase for a time interval $t = 1/B$, changing the phase for the next time interval 1/B, etc.

Typical prior art Frank code pulse compression systems employed phase coded transmitted signals and utilized pipeline compressors for the matched filtering process. However, because there are abrupt zero to $\pi$ phase shifts from element to element in certain portions of the Frank code, problems arose during the reception process. In particular, when a receiver was utilized with a bandwidth equal to the reciprocal of the length of one code element (the compressed pulse length), then the abrupt phase shifts noted above caused amplitude modulation on the signals passing through the receiver. The amplitude modulation was due to the fact that the period of time required for a circuit such as a receiver to build up to a given amplitude is inversely proportional to the bandwidth of the circuit. A zero to $\pi$ phase shift requires the signal amplitude of the receiver to go to zero and then a build up to the same signal amplitude but with a $\pi$ phase. Thus, when abrupt phase changes of $\pi$ radians occur in a code, as they do in the mid-section of the Frank code, the band limited receiver must de-ring and re-ring with the amplitude of the response going through zero with a non-infinite slope. Clearly, such amplitude modulation will increase the range-time sidelobes of the response.

Additionally, the pipeline compressors used in such prior art systems employed a tapped delay line with N taps each separated by the time duration of a code element, a series of phase shifters, one phase shifter connected to each of the N taps, and an N-way adder to add the outputs from the N phase shifters. Accordingly, such pipeline compressors used many elements and were inefficient. Moreover, the phase shifting elements utilized therein included L and C reactances which would cause circuit ringing thereby yielding higher range-time sidelobes.

A recent invention by Lewis and Kretschmer, "Low Sidelobe Pulse Compressor", patent application Ser. No. 230,984, solved this amplitude modulation problem and the inefficient compressor problem by recognizing that the Frank phase code may be derived from sampling an in-phase I and a quadrature Q detected step approximation to a linear frequency modulated waveform. They also recognized that the Frank phase code was the complex conjugate of the steering weights of a Fast Fourier Transform (FFT) circuit. In the above referenced application, Lewis and Kretschmer disclosed a compressor system that transmitted a step approximation to a linear frequency modulated waveform, a receiving circuit, means for I and Q detecting the echo signals, means for sampling these signals once per compressed pulse length, means for converting the samples to digital words, means for passing these digital words through a digital FFT, means for differentially delaying the output frequencies obtained therefrom in order to make them simultaneous, and means for adding the simultaneous frequencies to form the compressed pulse. Each frequency in the transmitted waveform lasted for the square root of the pulse compression ratio longer than the duration of the compressed pulse. Thus, the receiver amplifier did not modulate the echo significantly. Moreover, the FFT replacement for the pipeline compressor reduced the number of operations that had to be performed and significantly increased the efficiency.

The digital Fourier transform circuit utilized in that digital system sampled the incoming echo signal at certain discrete times and then compared these samples of the echo with the transmitted waveform and produced an output which was the autocorrelation function of the transmitted waveform. This autocorrelation function had a maximum value when the sampling was begun simultaneously with the occurrence of the leading edge of the incoming target-echo signal. However, when the target-echo leading edge arrived half way between samples, then the maximum of the autocorrelation function was significantly reduced. The target echo signal energy was essentially spread over two or more sampling periods or range cells resulting in a flattened maximum mainlobe with a low mainlobe to sidelobe ratio, e.g., the compressed pulse height was reduced and the compressed pulse length was increased. Thus, such a half sampling period error yielded a significant range resolution loss and a decrease in radar sensitivity.

Such spreading of the mainlobe is especially detrimental in radar systems because it allows large cross-section targets with large sidelobes to effectively mask smaller targets, i.e., an aircraft with a large cross-section could effectively mask a missile of much smaller cross-section. Accordingly, this flattening of the mainlobe relative to the sidelobes is of prime concern in the reflected signal processing art.

OBJECTS OF THE INVENTION

Thus, it is an object of the present invention to provide frequency code or Frank code pulse compression system with low range time grating lobes and which is capable of providing arbitrarily large pulse compression ratios with high efficiency.

It is a further object of the present invention to increase the mainlobe-to-sidelobe ratio in a pulse compression system.

It is yet a further object of the present invention to eliminate the sampling error attendant to the use of digital Fourier transform circuits in a pulse compression system.

Other objects, advantages, and novel features of the present invention will become apparent from the detailed description of the invention, which follows the summary.

SUMMARY OF THE INVENTION

Briefly, the present invention comprises a pulse compression system for compressing coded signals, and in particular, step approximation to linear FM and Frank Coded signals, without sampling errors or the high sidelobes caused by typical analog matched filters. This system comprises:
a receiving circuit,
a sliding window discrete Fourier Transform (DFT) or Fast Fourier Transform circuit including
an analog delay line with N signal taps, with a predetermined delay between each pair of adjacent signal taps,
a phasor circuit including a set of resistor-type networks for resistively phase weighting the signals on the N taps to yield $N^2$ phase weighted signals;
N adder circuits, each adder circuit adding a particular set of N signals from the $N^2$ phase weighted signals so that only the frequency may peak at each adder circuit output;
a circuit for applying the echo signal from the receiving circuit to the delay line of the sliding window DFT circuit without clock sampling;
a differential delay circuit for differentially delaying the outputs from the N adder circuits to make them occur simultaneously; and
a summing circuit for adding the differentially delayed outputs from the differential delay circuit to yield a short pulse which will have a peak amplitude when an echo signal is properly indexed in the DFT or FFT circuit delay line.

DESCRIPTION OF THE PREFERRED EMBODIMENT

As noted above, the present invention solves the sampling error problem of the previously described prior art systems by eliminating the sample and hold feature and the analog-to-digital conversion feature in such compression systems and, by replacing the digital FFT with an analog discrete Fourier transform (DFT or FFT). The resulting system is especially well suited for the decoding of step approximation to linear frequency modulation coded pulses. In particular, the DFT of the present system eliminates the analog filter ringing problem of previous step approximation to linear frequency modulation compressors. This filter ringing problem was caused by the fact that crystal filters, when shock excited, generate outputs which decay exponentially with time. Due to this exponential decay, a number of bandpass crystal filters in a comb filter may be ringing simultaneously despite the use of differential delays in each bandpass filter channel. Such ringing significantly adds to the range-time-grating lobes causing high range time sidelobes.

Figure 1:
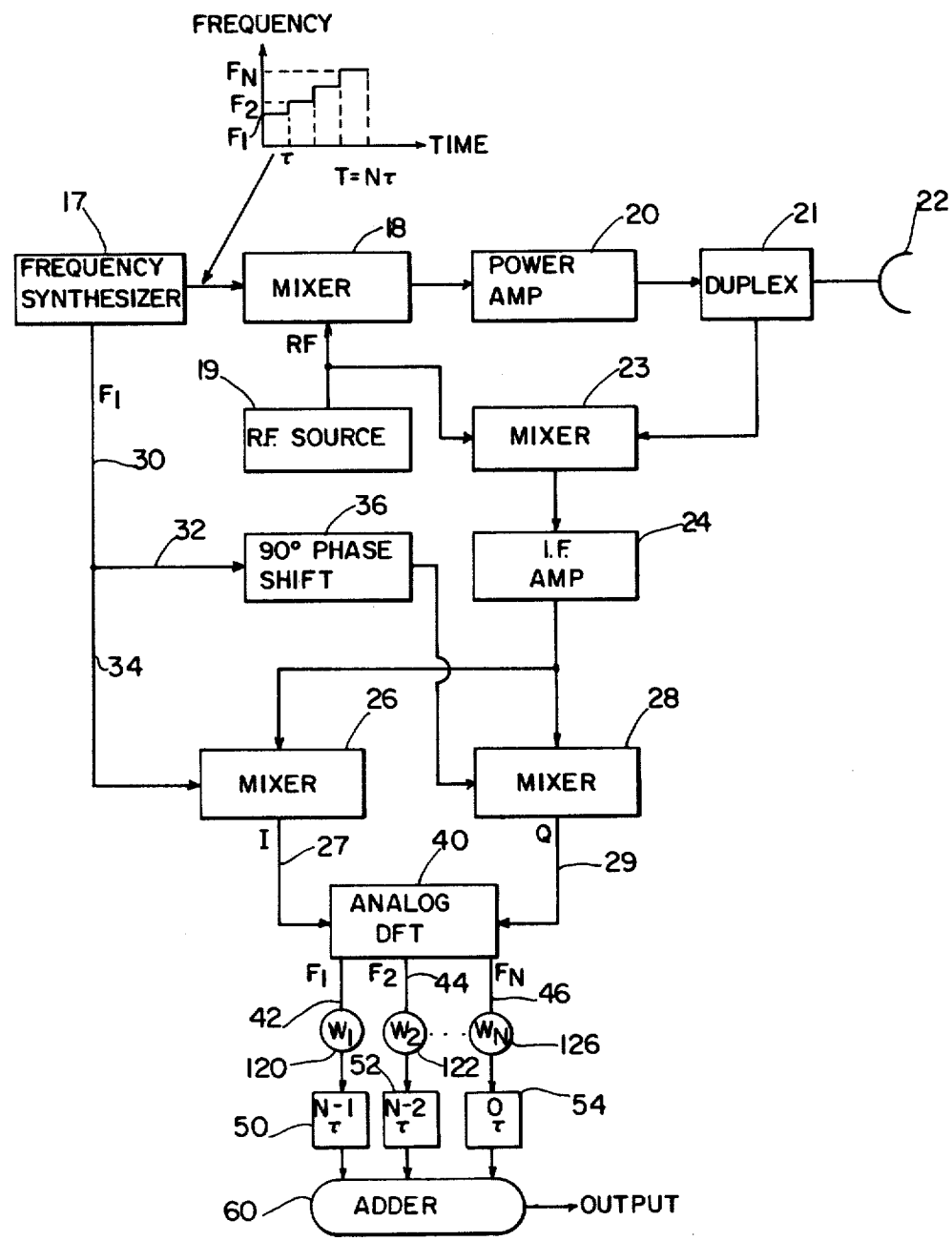
FIG. 1 is a detailed block diagram of one embodiment of the present invention.

Referring now to the drawings, FIG. 1 is a block diagram representation of the preferred embodiment of the present invention. In this figure, a frequency synthesizer 17 is utilized to produce a step approximation to linear FM coded pulse signal. This pulse signal is shown above the figure. In essence, the frequency synthesizer 17 produces N contiguous intermediate frequency steps of length $\tau$ on successively higher coherent carrier frequencies to form a total transmit pulse length of $T = N\tau$. The intermediate frequency signal of the pulse has a frequency which varies from a frequency $F_1$ to a frequency $F_N$ as time varies from a time zero to a time T. The frequency separation F between adjacent frequency steps is made equal to $N/T = 1/\tau$. This $1/\tau$ frequency separation is required in order to prevent the formation of the second compressed pulse in a repeated pulse train. (The reciprocal of $\Delta F$ is equal to the time between pulses in a repeated pulse train, i.e., the pulse repetition rate. If $1/\Delta F$ is greater than $\tau$, then the second pulse in the repeated pulse train will be recreated.)

The resultant step approximation to linear FM signal from the frequency synthesizer 17, is applied to a mixer 18 wherein it is mixed up to ratio frequency by heterodyning it with an RF signals applied by RF signal generator 19. The resultant RF pulsed signal is amplified by a power amplifier 20, passed through a standard duplexer 21 and radiated from a radar antenna 22.

Echos received by the antenna 22 are supplied by the duplexer 21 to a mixer 23. The mixer 23 heterodynes this echo signal with the same RF signals supplied by the RF signal generator 19 for transmit in order to obtain an intermediate frequency echo signal varying from frequency $F_1$ to frequency $F_N$. The resultant intermediate frequency echo signal is amplified in an IF amplifier 24 having a bandwidth from $F_1$ to $F_N$ centered on the frequency $(F_1 + F_N)/2$.

In order to obtain the information baseband, the intermediate frequency echo signal from the amplifier 24 must be beat or heterodyned with a local oscillator (LO) intermediate frequency signal. However, because the intermediate frequency echo signal could have any phase at the time of reception by the receiver, proper processing requires the generation of I and Q signals in phase quadrature in order to obtain both amplitude and phase information. Accordingly, the intermediate frequency echo signal from the amplifier 24 is applied to the mixers 26 and 28. A local oscillator intermediate frequency is applied via the lines 30 and 34 from the frequency synthesizer to a second input of the mixer 26 wherein it is heterodyned with the IF echo signal from the IF amplifier 24 to yield a baseband I signal on the line 27. The use of an LO intermediate frequency signal from the frequency synthesizer 17 allows coherent detection of the information baseband I signal.

The same LO intermediate frequency signal from the frequency synthesizer 17 is also applied via the lines 30 and 32 and the 90° phase shifter 36 to a second input of the mixer 28. The mixer 28 heterodynes this quadrature LO signal with the intermediate frequency echo signal from the amplifier 24 to yield a baseband Q signal on the line 29. Again, the use of the LO signal from the frequency synthesizer 17 allows coherent detection of the information baseband Q signal.

The LO intermediate frequency signal from the frequency synthesizer 17 should preferably be within the band defined by the frequencies $F_1$ and $F_N$. The utilization of a LO intermediate frequency signal significantly outside this band would give rise to rapid phase shifts with time which can cause significant inaccuracies to arise in the decoding process. For purposes of explanation only, and not by way of limitation, the LO intermediate frequency signal is chosen as $F_1$ in the discussion that follows. Accordingly, when the intermediate frequency echo signals from the amplifier 24 are multiplied by the LO intermediate frequency signal $F_1$, then the resulting signal will have a frequency response varying from zero to $F_N - F_1$.

The I and Q signals on the lines 27 and 29, respectively, are applied to a sliding window discrete Fourier transform (DFT) circuit. In essence, this Fourier transform circuit may be thought of as either expanding a pulse to a set of discrete frequencies spread over time (changing from the time to the frequency domain), or, as in this case, compressing a set of discrete frequencies in time into a single short pulse in time (changing from the frequency to the time domain).

In this instance, the purpose of the Fourier transform circuit is to take successive samples in time, and phase weight those samples such that when a received signal is properly indexed in the trans-form circuit, then its output may be compressed into a short pulse with a significant amplitude after proper differential delays.

The advantage to the use of the sliding window DFT circuit 40 is that echo signals will continuously index through the circuit so that at one given point the echo will be properly indexed in the circuit and a peak amplitude will be obtained on the output lines 42, 44 and 46.

In operation, the DFT circuit 40 takes a plurality of I and Q samples, generates a plurality of different phase weighted signals from each sample taken, and then recombines these phase weighted signals in such a manner that each output from the DFT circuit 40 will represent the presence of a different frequency step in the signal. Accordingly, outputs 42, 44 and 46 from the DFT 40 represent the presence or absence of the frequencies $F_1$, $F_2$, and $F_N$ in the echo signal pulse. These signals are applied to a differential delay circuit composed of the differential delay elements 50, 52, and 54. The differential delay elements operate to make the progressive step frequencies $F_1$ through $F_N$ occur simultaneously in time. By way of example, it can be seen that the frequency $F_1$ was transmitted on the coded pulse as its first frequency step. In order to make this frequency step occur simultaneously with the last frequency step $F_N$, it is necessary to delay the occurrence of the frequency step $F_1$ by the time delay equal to the number of steps minus one times the width of each step, i.e., a time delay of $(N-1)\tau$. Likewise, in order to delay the frequency $F_2$ such that it occurs simultaneously with the last frequency $F_N$, it is necessary that the $F_2$ frequency output on line 44 be delayed by the delay $(N-2)$. Thus, it can be seen that each frequency step must be delayed by an amount of delay determined by its location in the coded pulse relative to the last frequency step $F_N$.

When all of these decoded frequency steps on the lines 42, 44 and 46 have been appropriately differentially delayed such that they occur simultaneously, then they are applied to an adder circuit 60 which will add all of these frequency steps into a signal short pulse of length $T/N^2 = 1/B$. When the frequency steps of an echo signal are appropriately indexed such that a peak signal is obtained on each of the lines 42, 44, and 46, then the output from the adder circuit 60 will have a magnitude of N times the peak output from any of the differentially delayed signals and will last for a time equal to $T/p$, where p is the pulse compression index and is equal to $p = (F_N - F_1) T$.

Figure 2:
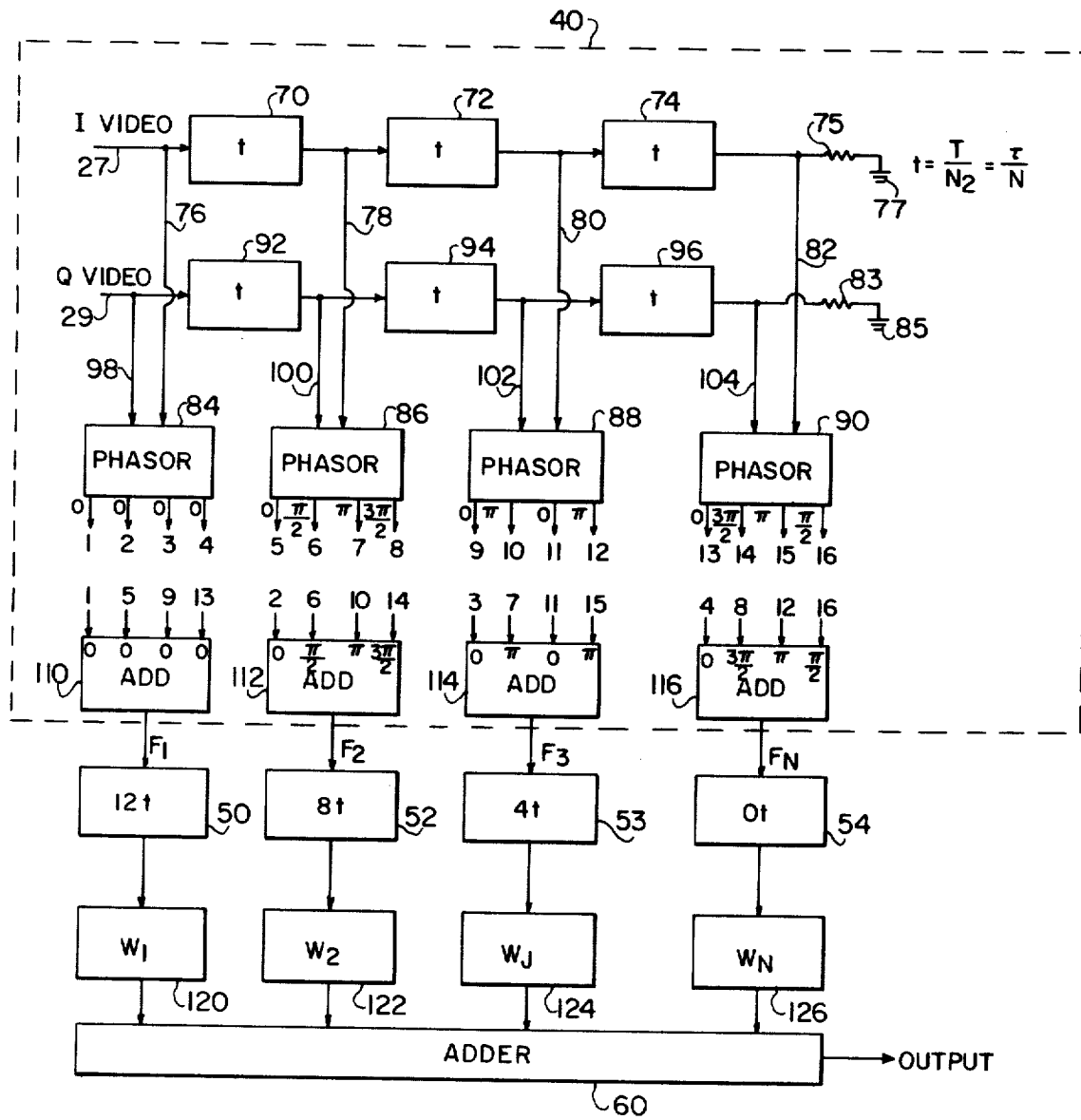
FIG. 2 is a detailed block diagram of one embodiment of an analog DFT which may be utilized as the DFT in the embodiment of FIG. 1.

Referring now to FIG. 2, there is disclosed an embodiment of a DFT circuit which may be utilized to implement the sliding window DFT circuit 40 of FIG. 1. This circuit is shown for a coded pulse with four frequency steps, i.e., N=4. Thus, the sliding window DFT will be a 4-point DFT. It is of course understood, that the disclosure of a 4-point DFT is done for purposes of explanation only, and is in no sense a limitation on the present invention.

In order to implement the present DFT for a 4-point system, a tapped delay line with $N-1$ or three delay elements is provided for both the I and Q signals applied on the lines 27 and 29, respectively. Accordingly, the I signal is applied through three successive delay elements 70, 72 and 74 with each delay element having a delay t equal to $T/N^2 = \tau/N$, the compressed pulse length, where $N^2$ equals the pulse compression ratio $N^2 = p = T (F_N - F_1) = TB$. The output from the delay element 74 is terminated in a resistor 75 connected to ground potential 77, with the resistance of resistor 75 equal to the characteristic impedance of the delay line in order to ensure that there will be no reflections of the signal at this termination point. Signal taps are taken in front of each delay element and after the last delay element to provide a total of N or 4 signal taps.

The outputs from the N signal taps are applied to phasor circuits which operate to generate a plurality of phase weighted signals which may be appropriately combined in order to resolve the different frequency steps in the coded pulse. More specifically, the tap 76 in front of the delay element 70 is applied to the phasor circuit 84. Likewise, the tap 78 in front of the delay element 72 is applied to the phasor circuit 86. The tap 80 in front of the delay element 74 is applied to the phasor circuit 88. Finally, the last tap 82 is applied to the phasor circuit 90.

Likewise, the Q signal on the line 29 is applied through a series of successive delay elements 92, 94 and 96. The last delay element 96 is terminated in a resistor 83 connected to ground potential 85, with the resistor value of resistor 83 being equal to the characteristic impedance of the delay line to prevent signal reflections. Again, there are signal taps in front of each delay element and after the last delay element. The signal tap 98 in front of the delay element 92 is applied to the phasor circuit 84. The signal on the tap 100 in front of the delay element 94 is applied to the phasor circuit 86. The signal on tap 102 in front of the delay element 96 is applied to the phasor circuit 88. Finally, the signal on the last tap 104 is applied to the phasor circuit 90.

It is well known that DFT circuits require as many samples as there are frequency steps to unambiguously detect a given frequency step. Accordingly, for an N frequency step system, there are required N different samples to unambiguously resolve each of these N frequency steps. In this case since N=4, $N^2$ or 16 samples are require to resolve the entire 4 frequency steps and thus decode the echo pulse. Thus, each phasor circuit generates four different phase weights for each I and Q signal pair applied to its input. In particular, the phasor circuit 84 generates four I and Q signal pairs, 1, 2, 3, and 4, each phase shifted by a zero phase shift. The phasor circuit 86 generates four I and Q signal pairs 5, 6, 7, and 8 with the phase shifts 0, $\pi/2$, $\pi$, 3 $\pi/2$, respectively. Likewise, the phasor circuit 88 generates four I and Q signal pairs 9, 10, 11, and 12 having a phase weights 0, $\pi$,0, $\pi$, respectively. Finally, the phasor circuit 90 generates four I and Q signal pairs 13, 14, 15, and 16 with the phase weights 0, $3\pi/2$, $\pi$, $\pi/2$, respectively. For the general case, the ith phase shift will be $$\phi = (i-1)2/N^2$$

where i runs from 1 to $N^2$.

The 16 phase weighted samples are rearranged and applied to a set of adders 110, 112, 114, and 116. One phase shifted I and Q signal pair from each of the phasor circuits 84, 86, 88, and 90 is applied to each of the adder circuits such that the phase weighted signals from four different samples are applied to each adder. As noted above, N, or 4 in this case, different samples are required to unambiguously resolve each of the frequency steps.

Figure 3:
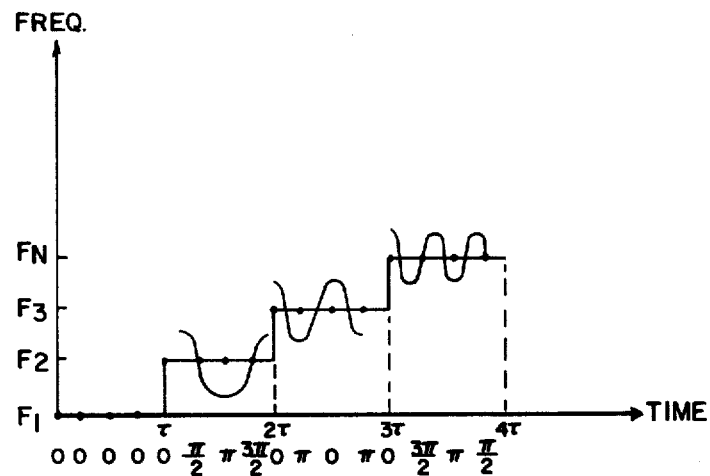
FIG. 3 is a graphical illustration of a baseband linear step approximation to FM coded signal with the appropriate decoding phase weights listed below each step.

In order to obtain a better understanding of this frequency decoding process, the frequency step coded signal is shown in more detail in FIG. 3. As was noted earlier, it is required in frequency step coded pulses to make the change in frequency between adjacent steps $\Delta f = 1/\tau$. This prevents the spectral lines (bands) of the desired pulse from lasting long enough to recreate the compressed pulse. Additionally, this $1/\tau$ frequency difference between steps insures that there will be a phase shift across each frequency step of one cycle of $2\pi$. Thus, when the incoming echo signal is mixed with the first frequency step $F_1$ in the mixers 26 and 28 of FIG. 1, the difference signal $F_1-F_1$ will have a 0 phase shift across this step. Thus, the four different samples will each be shifted by a 0 phase weight. The output from the mixers 26 and 28 for the next frequency step $F_2$ will be the frequency difference signal $F_2-F_1$ which will have one cycle of phase shift across the step or a progressive shift of $\pi/2$ between each set of adjacent samples, i.e., $0,\pi/2,\pi,3\pi/2$. Likewise, the difference frequency signal for the third frequency step $F_3$ will be $F_3-F_1$, which will have a two cycles phase shift across the step or a progressive shift of $\pi$ between each set of adjacent samples, i.e., 0, $\pi$,0, $\pi$. Finally, the frequency difference signal for the last frequency step $F_N$ will be $F_N-F_1$, which will have a phase shift in this case of three cycles across the step or a progressive shift of 3 $\pi/2$ between each set of adjacent samples, i.e., $0,3\pi/2,\pi,\pi/2$.

By examining the slope of the phase increase of each sample within a given step, it will be seen that the *slope* increases linearly therein. Since frequency is the rate of change of phase, then a linearly increasing phase is equivalent to a constant frequency. Thus, it can be seen that each different set of four I and Q samples applied to the respective adders 110, 112, 114, and 116 represents a different frequency measured with respect to the carrier frequency. Accordingly, it can be seen that the 0 phase weighted signals from four different samples, 1, 5, 9, and 13 (the first phase from each phasor) will decode the frequency step $F_1$. Likewise, the line 2 signal phase weighted by 0, the line 6 signal phase weighted by $\pi/2$, line 10 signal phase weighted by $\pi$, and the line 14 signal phase weighted by 3 $\pi/2$ (the second phase from each phasor) will decode the frequency $F_2$ at the adder 112. The signal on line 3 phase weighted by 0, plus the signal on line 7 phase weighted by $\pi$, plus the signal on line 11 phase weighted by 0, and the signal on line 15 phase weighted by $\pi$ (the third phase from each phasor) will decode the frequency step $F_3$ in the adder 114. Finally, the signal on line 4 phase weighted by 0, plus the signal on line 8 phase weighted by 3 $\pi/2$, plus the signal on line 12 phase weighted by $\pi$, and the signal on line 16 phase weighted by $\pi/2$ (the fourth phase from each phasor) will decode the frequency step $F_N$ in the adder 116. The outputs from these adders 110, 112, 114, and 116, in essence, are equivalent to the different frequency ports of an n point FFT.

The decoded frequency outputs from the adders 110, 112, 114, and 116 are applied to the differential delay elements 50, 52, 53, and 54 respectively. In the case where N=4, then the delay for the delay element 50 will be $(N-1)\tau = 12t$. The delay for the delay element 52 will be $(N-2)\tau = 8t$. The delay for the delay element 53 will be $(N-3)\tau = 4t$. Finally, the delay for the delay element 54 will be 0.

The outputs from the differential delay elements 50, 52, 53, and 54 may be applied to amplitude weighting circuits 120, 122, 124, and 126, respectively, which may be implemented with resistive dividers, in order to control the sidelobes of the response. There are a variety of amplitude weighting techniques disclosed in the art. See for example Nathanson, *Radar Design Principles*, McGraw-Hill Book Company, at page 529.

After appropriate signal weighting, these signals are then applied to the adder 60 to be added together (I and Q signals added separately) to form a compressed pulse. As noted previously, at one instant as the echo pulse propagates thru the I and Q delays lines, the pulse will be properly indexed in the filter such that the four frequency step decoded signals will peak at the same time. This simultaneous peaking will yield a short pulse with a large amplitude.

One of the major problems in prior art analog DFT's and one of the prime reasons why many decoding systems were made digital, is that the phase shifting circuits utilized in the prior art to apply the phase weights were implemented with reactive elements. However, any phase shifting element containing reactance (stored energy) can ring. Such ringing significantly increases the sidelobes for the system. However, the present phasor circuits have been implemented without L or C elements thereby eliminating ringing problems. The phase weighting in the present invention is accomplished by means of coordinate rotation techniques. Accordingly, the phasor circuits 84, 86, 88, and 90 are implemented by means of a series of voltage divider circuits and adders.

Figure 4:
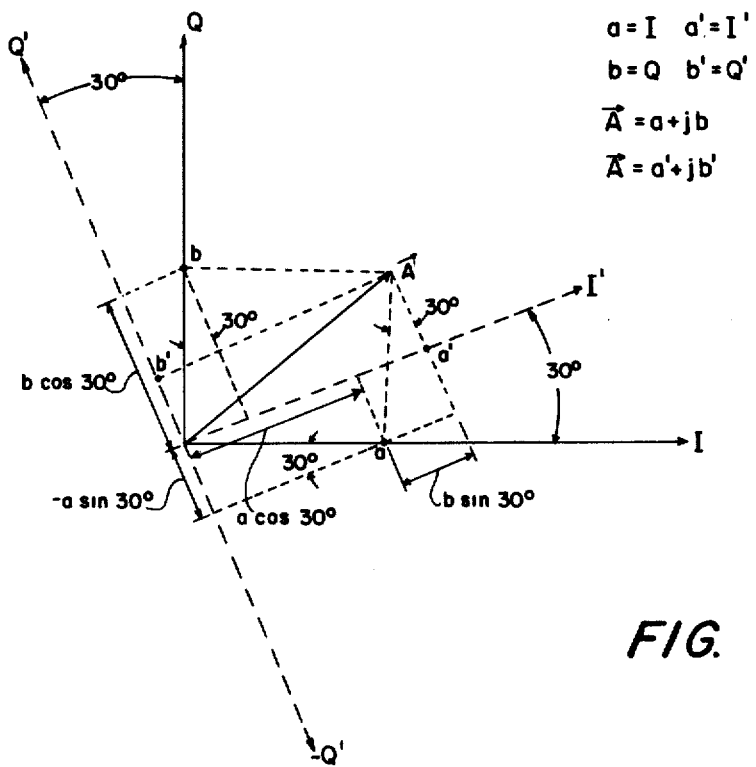
FIG. 4 is a graphical illustration of the teachnique of phasor coordinate rotation.

FIG. 4 illustrates the coordinate rotation technique utilized in implementing the present phasor circuits. In essence, this technique is based on the idea that a phase shift may be accomplished by rotating the coordinate system. The figure shows a vector $\vec{A}$ in a basic I and Q coordinate system. The vector $\vec{A}$ has a value of a $\vec{I} + \vec{JQ}$ in this coordinate system. The coordinate rotation will be illustrated for a phase shift angle of +30 degrees. Although this 30 degree phase shift does not correspond any of the phase shift weights shown in FIG. 2, this phase shift is useful to illustrate the general case of coordinate rotation. The new coordinate system $\vec{I}'$ and $\vec{JQ}'$ is shown by dashed lines as being rotated by −30 degrees from the original coordinate system axis. Using standard projection techniques, it can be seen that following equations holds true:

$$I' = I \cos \theta + Q \sin \theta$$

$$Q' + -I \sin \theta + Q \cos \theta.$$

In this case, the angle $\theta$ is 30°. Thus, $\cos 30° = 0.866$, and $\sin 30° = 0.5$. By applying plus and minus I and Q signals through a voltage dividing sequence, and then appropriately adding these voltage-divided signals, a set of I' and Q' signals may be obtained.

Figure 5:
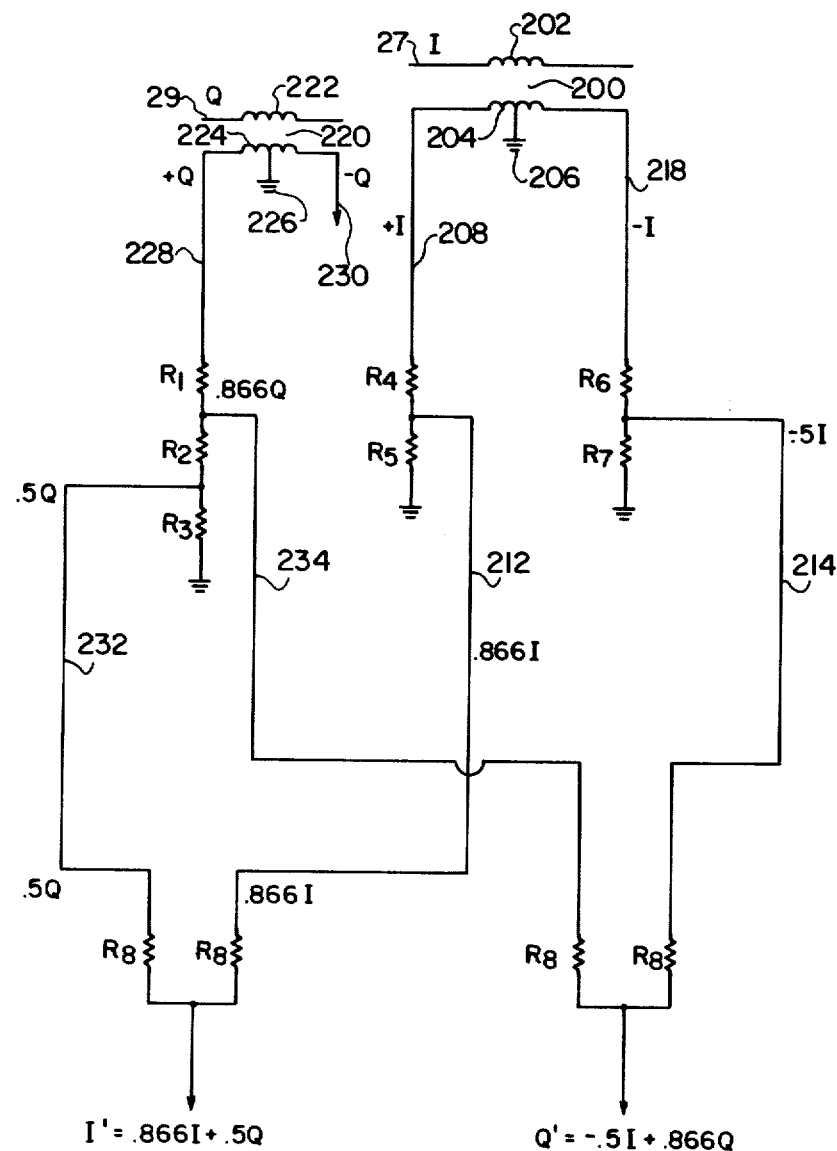
FIG. 5 is a schematic circuit diagram of a portion of a phasor circuit which may be utilized in the DFT embodiment of FIG. 2.

FIG. 5 discloses one circuit embodiment using a coordinate rotation technique to shift the phase of I and Q signals by −30 degrees. The taps taken before each of the delay elements and after the last delay element in FIG. 2 may be conveniently implemented by means of transformers. The use of such transformers allows the matching of impedences at the tap points thereby preventing reflections. Reflections from impedance mismatches at the tap points could propagate back from the tap point and add at the next adjacent tap thereby increasing the range-time sidelobes. In this circuit embodiment, a center tapped transformer 200 is utilized to tap the I signal on line 27. This transformer 200 comprises a primary winding 202, and a secondary winding 204 center tapped to ground 206. The use of a center tapped transformer allows the generation of both positive and negative I signals. The positive I signals are applied on line 208 through the voltage divider consisting of the resistors $R_4$ and $R_5$ in order to yield a signal equivalent to 0.866I on line 212. Likewise, the negative I signal on line 210 is applied through a voltage divider consisting of the resistors $R_6$ and $R_7$ in order to yield a signal on line 214 equivalent to −0.5I.

Likewise, each of the signal taps before each of the delay elements and after the last delay element in the Q delay line is implemented via a center tapped transformer 220. The transformer 220 shown in FIG. 5 has a primary winding 222 connected to the line 29, and a secondary winding 224 center tapped to ground 226. A +Q signal is obtained on the line 228 while a −Q signal is obtained on the line 230. The +Q on line 228 is applied through a voltage divider comprising the resistors $R_1$, $R_2$, and $R_3$. The signal taken at the junction of the $R_1$ and $R_2$ resistors on the line 234 is equivalent to 0.866Q. Likewise, the signal taken at the junction of the resistors $R_2$ and $R_3$ on the line 232 is equivalent to 0.5Q.

The 0.866I signal on line 212 and the 0.5Q signal on the line 232 are summed together in the resistive adder composed of the two resistors $R_8$ to yield the signal $$I' = 0.866I + 0.5Q.$$

Likewise, the signal −0.5I on the line 214 is summed together with the signal 0.866Q on the line 234 in the resistive adder composed of the two resistors $R_8$ to yield the signal $$Q' = 0.5I + 0.866Q.$$

The design equations for the resistors shown in FIG. 5 are set forth below:

$$\frac{5_2 + R_3}{R_1 + R_2 + R_3} = \cos \theta = .866; \frac{R_5}{R_4 + R_5} = \cos \theta = .866$$

$$\frac{R_3}{R_1 + R_2 + R_3} = \sin \theta = .5; \frac{R_7}{R_6 + R_7} = \sin \theta = .5$$

$$R_1 + R_2 + R_3 = R_4 + R_5 + = R_6 + R_7 \leq R_8/10$$

The I' and Q' output shown for FIG. 5 is equivalent to the phase weighted output for one of the 1-16 phase weighted output signals from the 4 phasors shown in FIG. 2. Accordingly, 16 voltage divider circuits of the type shown in FIG. 5 are required in order to implement the four phasor circuits 84, 86, 88, and 90 of FIG. 2.

The advantages of the present invention over the prior art are its efficiency, lack of sampling error, and the low sidelobes that can be obtained via the elimination of analog-filter-ring induced grating lobes. These advantages are obtained by the use of unsampled I and Q video signals with an analog sliding window DFT as the compressor. The particular sliding window DFT utilized in the present invention implements its phase weighting functions by means a set of resistive divider networks. Thus, reactive element ringing common to prior art sliding window DFT's is eliminated. It should also be noted that the compressor of the present system can be completely passive and is capable of achieving an essentially unlimited pulse compression ration.

As an alterative to the transmission of a step approximation to a linear FM coded signal, a Frank phase coded waveform on a single carrier frequency can be utilized. However, if a Frank phase coded waveform is used with the system, then the intermediate frequency amplifier 24 must be made wide enough in bandwidth to avoid amplitude modulating of the echos. The generation of the Frank coded waveform could be obtain by replacing the frequency synthesizer 17 by a cw oscillator, a gate, and a phase coder. The cw oscillator output would again be applied on lines 30, 32, and 34 to the mixers 26 and 28 to mix down the echos to I and Q video signals.

As an second alternative, a linear frequency modulated pulse (chirp) could be utilized with the present system. The system will then have a linear response. The linearity in this case, means that high frequency noise cannot fold over into the video passband. It should be noted that it is possible to eliminate low frequency noise fold over in the I and Q detectors by detecting the I, Q baseband signals with a frequency $(F_n - F_1)/2$ obtained from the frequency synthesizer and then suitably modifying the phase shifts in the phasors.

Finally, it should be noted that the delay elements 50, 52, 53 and 54 in the differential delay circuit may be implemented with clocked analog delay lines such as charge-coupled devices or bucket brigades. Such an implementation is possible because the individual frequency step phase matching has already been accomplished at this point so that sampling time errors will not be detrimental. Of course, the phase weights of the resistive divider phasor circuits would have to be changed in order to properly compress the chirp pulse. The same coordinate rotation technique would be used to develop the resistance values in the various resistive divider circuits in the system.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States:

1. A pulse compression system for compressing the echo signal returns from the pulse waveforms of electromagnetic energy propagated by a transmitter comprising:
    means for receiving an echo signal;
    a sliding window discrete Fourier Transform (DFT) circuit comprising:
        analog delay means with N signal taps, with a predetermined delay between each pair of adjacent signal taps;
        phasor means including a series of resistor-type networks for resistively phase weighting the signals on said N taps to yield $N^2$ phase weighted signals; and
        N adder circuits, each adder circuit adding a particular set of N signals from said $N^2$ phase weighted signals so that only one frequency may peak at each adder circuit output;
    means for applying the echo signal from said receiving means to the delay means of said sliding window DFT circuit without clock sampling;
    means for differentially delaying the outputs from said N adder circuits; and
    means for adding the differentially delayed outputs from said differentially delaying means to yield a short pulse which will have a peak amplitude when an echo signal is properly indexed in said delay line means of said sliding window DFT.

2. A pulse compression system as defined in claim 1, wherein said applying means comprises means for converting said echo signal to I and Q baseband signal pairs, and wherein said sliding window DFT circuit and said differentially delaying means are designed to operate on I and Q signal pairs.

3. A pulse compression system as defined in claim 2, further comprising means for amplitude weighting the inputs to said adding means to control sidelobes.

4. A pulse compression system as defined in claims 2 or 3, further comprising a transmitting circuit including
    a frequency synthesizer for generating a frequency modulated pulse;
    means for mixing the frequency modulated pulse from said frequency synthesizer to RF; and
    means for transmitting said RF pulse; and wherein said I and Q baseband converting means comprises:
    means for converting said received echo signal to an intermediate frequency (IF) signal;
    first mixer means for mixing the IF signal with a reference signal from said frequency synthesizer to obtain the I baseband signal; and
    second mixer means for mixing the IF signal with said synthesizer reference signal shifted in phase by 90° to obtain the Q baseband signal.

5. A method for compressing the echo signals from pulse waveforms of electromagnetic energy propagated by a transmitter comprising the steps of:
    receiving an echo signal;
    converting said echo signal to a baseband signal without clock sampling;
    processing said baseband signal using Fourier Transform steering including the steps of:
        delaying said baseband signal by a series of $N-1$ equal delays and taking a signal tap before each delay and after the last delay to yield N signals;
        resistively phase-weighting each of said N signals to prevent ringing to yield $N^2$ phase-weighted signals,
        adding N different sets of N phase-weighted signals from said $N^2$ phase-weighted signals so that a different frequency will peak for each different set of N phase-weighted signals
    means for differentially delaying the added output signals from the N different sets of N phase-weighted signals in said adding step to make them occur simultaneously; and
    adding the differentially delayed output signals from said differentially delaying step to yield a short pulse which will have a peak amplitude when an echo is properly indexed in said delaying step.

6. A method as defined in claim 5, wherein said converting step comprises the step of converting said echo signal to an I and Q baseband signal pair.

7. A method as defined in claim 6, further comprising the step of amplitude weighting the differentially delayed output signals prior to said adding step.

* * * * *